(12) United States Patent
Zhang et al.

(10) Patent No.: US 12,013,303 B2
(45) Date of Patent: Jun. 18, 2024

(54) APPARATUS AND METHOD FOR NON-INTRUSIVE PRESSURE MEASUREMENT AND EARLY IDENTIFICATION OF SOLIDS FORMATION USING SELECTED GUIDED ULTRASONIC WAVE MODES

(71) Applicant: ExxonMobil Technology and Engineering Company, Spring, TX (US)

(72) Inventors: Yibing Zhang, Annandale, NJ (US); Limin Song, West Windsor, NJ (US); Henry Alan Wolf, Morris Plains, NJ (US); Mark M. Disko, Glen Gardner, NJ (US); Ted A. Long, Spring, TX (US); Brian C. Seabrook, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 440 days.

(21) Appl. No.: 17/370,414

(22) Filed: Jul. 8, 2021

(65) Prior Publication Data
US 2022/0034739 A1    Feb. 3, 2022

Related U.S. Application Data

(60) Provisional application No. 63/126,204, filed on Dec. 16, 2020, provisional application No. 63/058,613, filed on Jul. 30, 2020.

(51) Int. Cl.
*G01L 11/06* (2006.01)
*G01F 1/66* (2022.01)
(Continued)

(52) U.S. Cl.
CPC ............... *G01L 9/001* (2013.01); *G01F 1/66* (2013.01); *G01F 1/667* (2013.01); *G01F 1/74* (2013.01);
(Continued)

(58) Field of Classification Search
CPC ...... G01L 9/001; G01L 11/04–06; G01F 1/66; G01F 1/667; G01F 1/74; G01F 15/02;
(Continued)

(56) References Cited

U.S. PATENT DOCUMENTS 6,575,043 B1 * 6/2003 Huang .................... G01F 1/002
                                                    73/861.25
10,557,731 B2    2/2020 Kippersund et al.
(Continued)

FOREIGN PATENT DOCUMENTS

EP         3644022 A1    4/2020

*Primary Examiner* — Alexander A Mercado
(74) *Attorney, Agent, or Firm* — ExxonMobil Technology and Engineering Company—Law Department

(57) ABSTRACT

A method of measuring a pressure of a fluid adjacent a wall of a pipe or vessel. A transducer is attached to the wall of the pipe or vessel. A signal is transmitted by the transducer at a characteristic frequency via a plurality of guided wave modes. The characteristic frequency is a frequency at which the guided wave modes are separated in time from each other when received. The signal is received after the plurality of guided wave modes travel in or through the wall a predetermined number of times. The signal has a signal receipt time after the predetermined number of times. The pressure of the fluid is calculated using the signal receipt time.

24 Claims, 12 Drawing Sheets

(51) Int. Cl.
  *G01F 1/667*   (2022.01)
  *G01F 1/74*    (2006.01)
  *G01F 23/296*  (2022.01)
  *G01L 9/00*    (2006.01)
  *G01N 29/02*   (2006.01)
  *G01N 29/22*   (2006.01)

(52) U.S. Cl.
  CPC ........... *G01F 23/296* (2013.01); *G01N 29/02* (2013.01); *G01N 29/222* (2013.01); *G01N 2291/024* (2013.01); *G01N 2291/02836* (2013.01); *G01N 2291/2634* (2013.01)

(58) Field of Classification Search
  CPC ... G01F 23/296; G01F 23/2968; G01N 29/02; G01N 29/222; G01N 2291/024; G01N 2291/02836; G01N 2291/2634
  See application file for complete search history.

(56) References Cited

U.S. PATENT DOCUMENTS

| | | | |
|---|---|---|---|
| 10,837,851 B2 | 11/2020 | Ploss et al. | |
| 2015/0177100 A1* | 6/2015 | Dietz | F03D 17/00 702/182 |
| 2017/0268950 A1* | 9/2017 | Norli | G01L 11/04 |
| 2017/0343514 A1* | 11/2017 | Takata | G01N 29/048 |
| 2019/0154531 A1* | 5/2019 | Ploss | G01F 1/66 |

\* cited by examiner

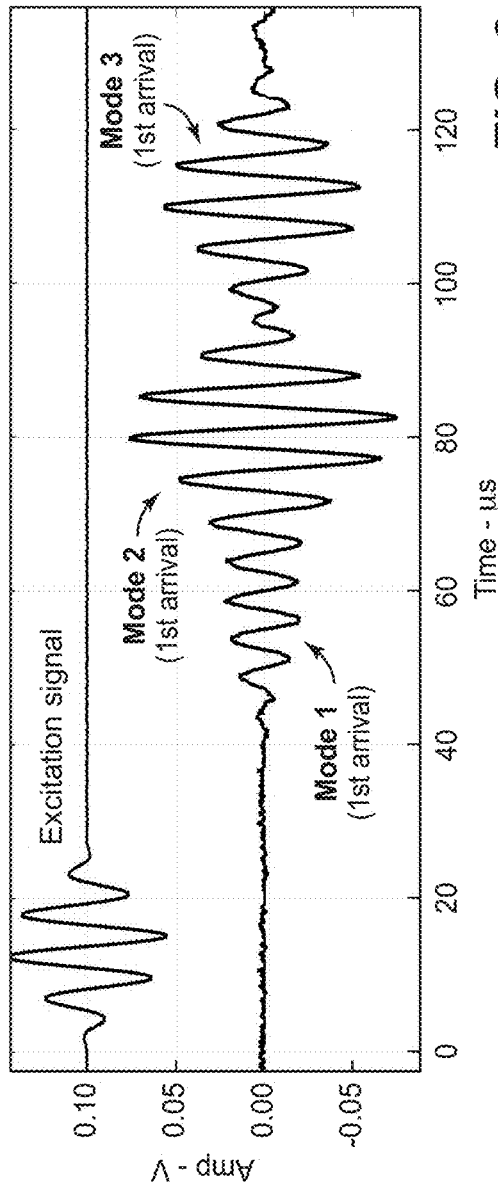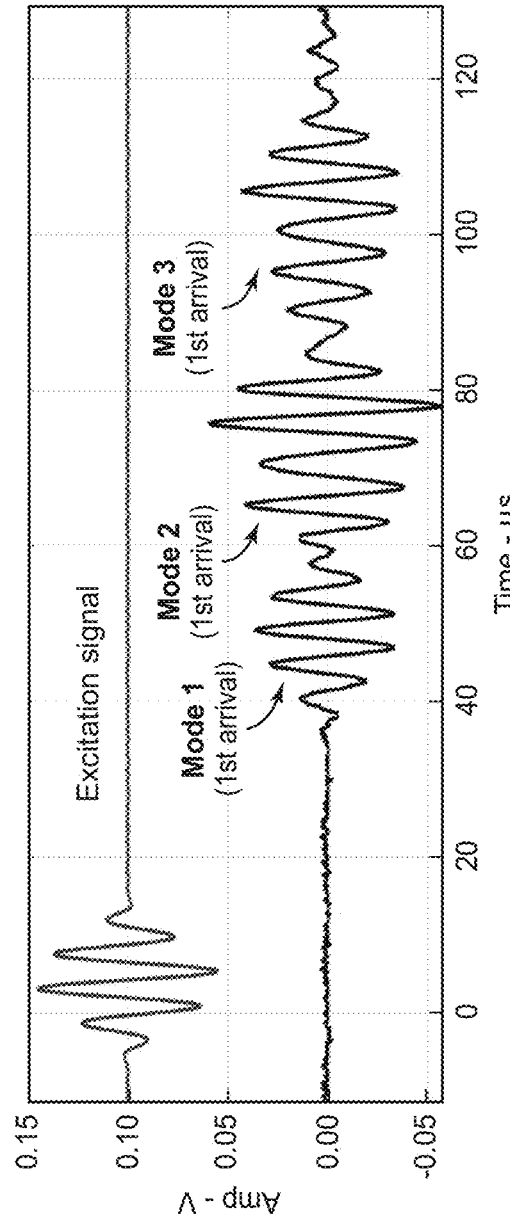

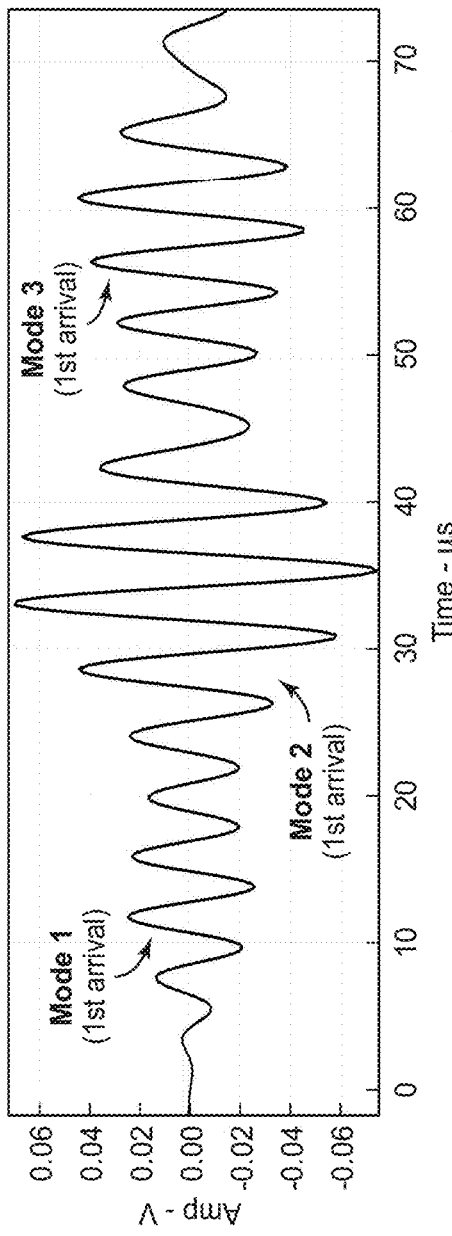
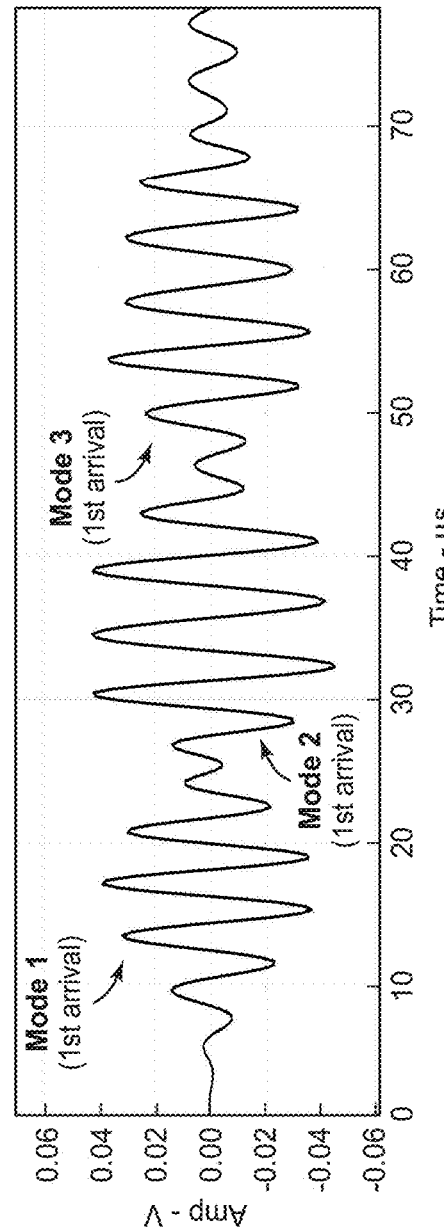
FIG. 4A
FIG. 4B

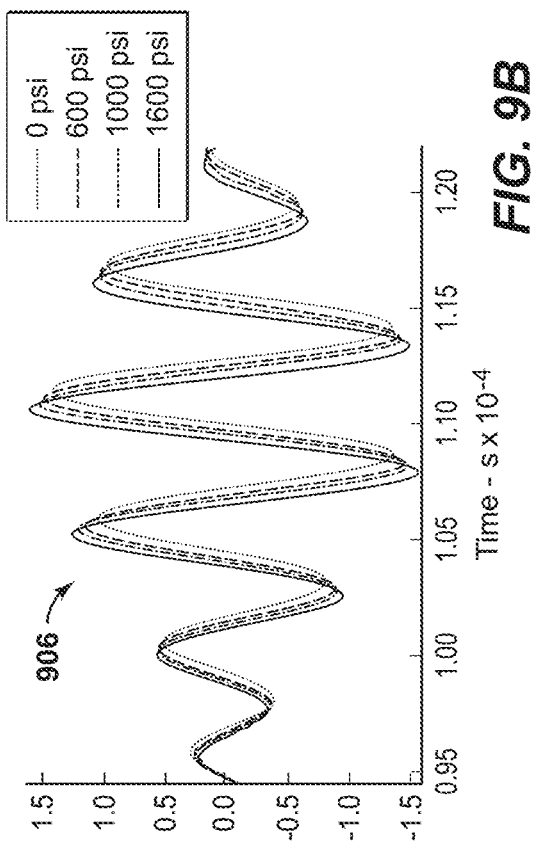
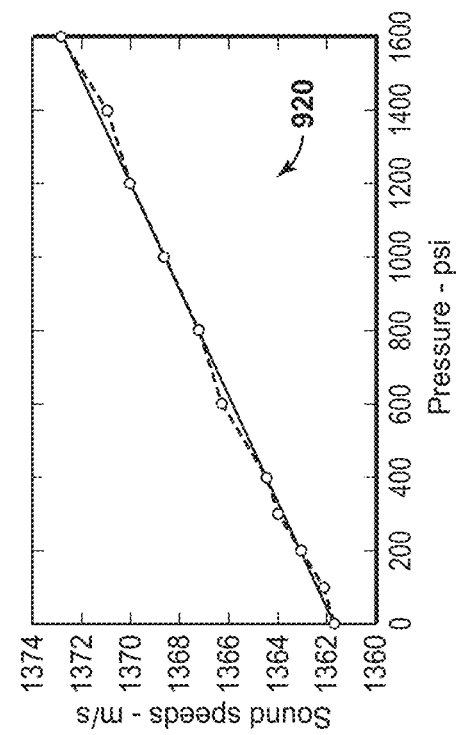
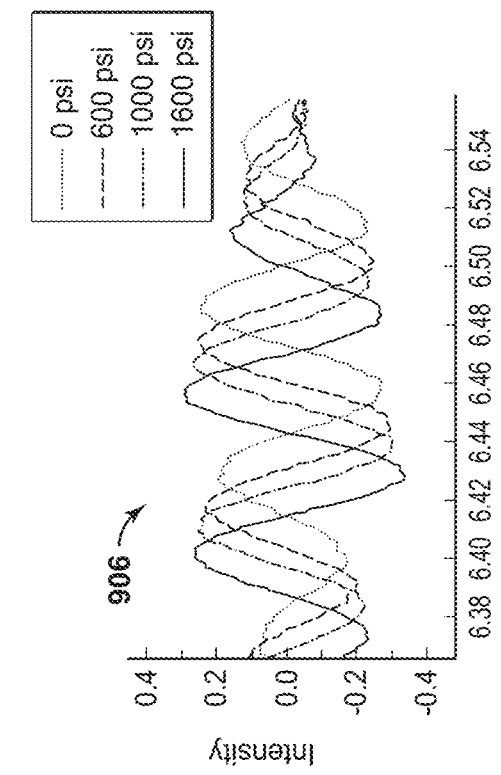
FIG. 9A
FIG. 9B
FIG. 9C
FIG. 9D

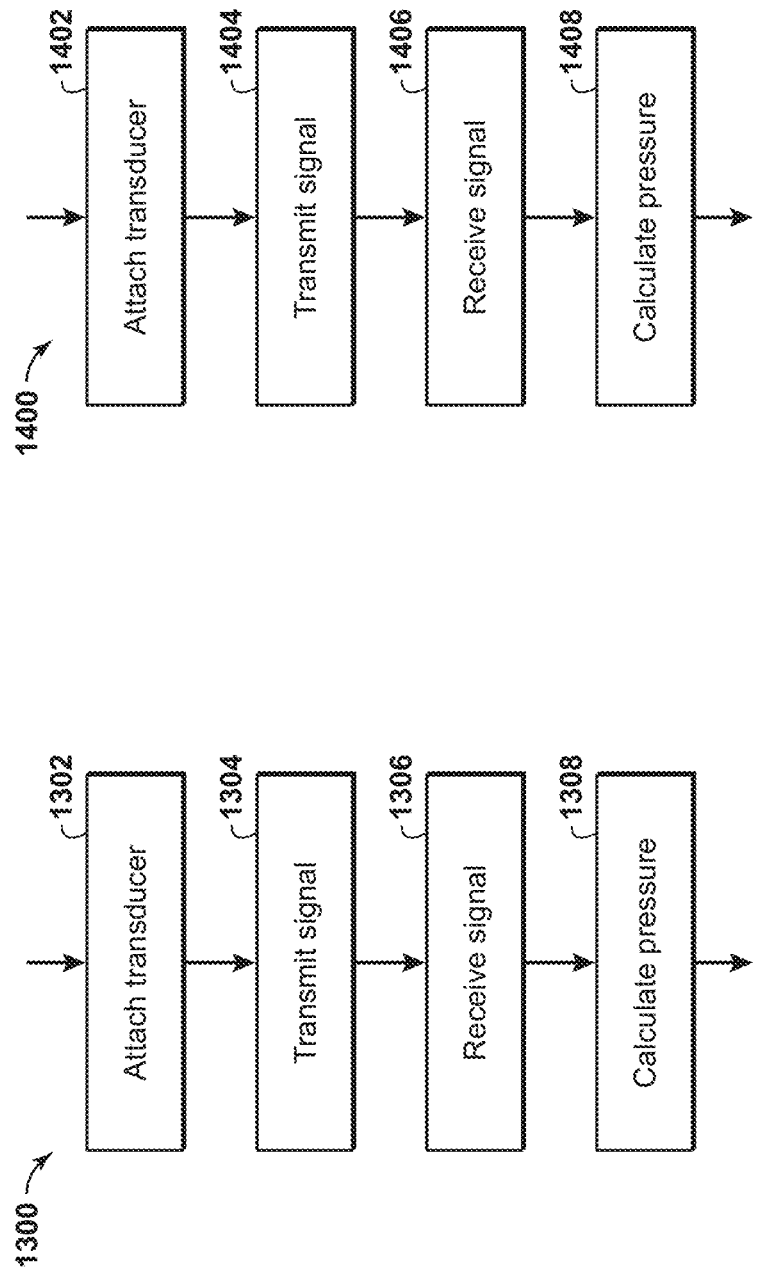

APPARATUS AND METHOD FOR NON-INTRUSIVE PRESSURE MEASUREMENT AND EARLY IDENTIFICATION OF SOLIDS FORMATION USING SELECTED GUIDED ULTRASONIC WAVE MODES

CROSS REFERENCE TO RELATED APPLICATIONS

This application claims the benefit of U.S. Provisional Application No. 63/058,613, filed Jul. 30, 2020, and U.S. Provisional Application No. 63/126,204, filed Dec. 16, 2020, the disclosures of which are herein incorporated by reference in their entireties.

FIELD OF THE INVENTION

The invention relates to pressure measurement, and more specifically, to the measurement of pressure in pipes and vessels, and to the identification of solids formation in such pipes and vessels.

BACKGROUND OF THE INVENTION

Pressure measurements typically are taken with intrusive pressure gauges, which are instruments or sensors that contact the fluid to be measured. Such intrusive pressure gauges are not preferable where it is important to maintain the integrity of the container or pipe holding the fluid. For example, measuring the pressure of a high-pressure fluid in a pipe with an intrusive pressure gauge may require drilling into the pipe to insert and place the sensor or sapphire window. Such intrusive pressure measurements have many known drawbacks, such as: introducing the potential for leakage from the pipe; the creation of holes, openings, and/or material interfaces which could accelerate corrosion or erosion, and induced temperature gradients that may introduce fouling and encourage the formation of hydrates. On the other hand, non-intrusive pressure-measuring methods are more attractive because of the safety concern from a pressure boundary and the mitigation or elimination of the drawbacks stated above. As used herein, a non-intrusive measurement method is one with no direct exposure or contact of a measurement device to the fluid being interrogated.

An example of a non-intrusive pressure sensor is a strain gauge attached to the outside of a pipe or vessel. The measured strains are calibrated to pressures inside the pipe or vessel. This type of strain based pressure measurement relies on the strain gauge performance, which measures localized structural deformations under the strain gauge. In addition, the strain measurements are affected by localized structure conditions, such as corrosion, as well as the attachment qualities. This becomes more problematic for a long term deployment due to localized structure corrosion and deterioration of the strain gauge attachment.

Another type of nonintrusive pressure measurement uses ultrasonic waves in a pipe or vessel. In such systems, an ultrasonic wave is generated using transducers clamped on or otherwise attached to an outer surface of the pipe or vessel. The ultrasonic wave propagates along the surface of the pipe, in the wall of a pipe, and/or within the liquid in the pipe along the axial direction of a pipe. In one example, the non-intrusive pressure sensor uses the travel-time difference between a critically refracted longitudinal wave and the reflected longitudinal waves within the wall of a pipe. A pair of ultrasonic transducers are needed for this strategy. Another example, used for smaller diameter pipes, correlates the transmission speed of ultrasonic waves in pipeline fluids with the pressure of the fluid. The transmission speed of the ultrasonic wave in the pipeline fluid is measured through ultrasonic propagation time of the fluid in the pipe cavity.

Another non-invasive pressure measurement technique uses changes in ultrasonic signal reflections from the fluid-vessel interface, where the reflection coefficient is a function of the pressure. Because the pressure induces only a small change of acoustic impedance of the liquid, this method has limited sensitivity, even with multiple reflections, and cannot be relied upon to provide accurate pressure measurements.

Still another non-intrusive pressure measurement technique uses ultrasonic bulk waves, such as Rayleigh waves. The sensitivities of ultrasonic Rayleigh waves at the vessel surface and critically refracted longitudinal (LCR) waves in the wall are different because of acousto-electric and thermal effects respectively. Two ultrasonic transducers are used to generate the Rayleigh and LCR waves. Multiple longitudinal waves along the axial direction of a pipe may also be used for temperature compensated pressure measurement.

Yet another approach is to use acoustic methods to separate pressure and flow measurements. In this known approach, however, multiple acoustic transmitters and receivers are needed for system excitation and signal decomposition.

In these known approaches to non-intrusive ultrasonic pressure measurement, the frequencies of the ultrasonic signals are all above 1 MHz, and the ultrasonic wave is treated as a bulk wave for the reported structures. When the ultrasonic wave is above 1 MHz, the attenuation of the wave in the pipe or vessel limits the acoustic propagation length, ultimately limiting the sensitivity of the pressure measurements.

Another possibility for non-intrusive ultrasonic pressure measurement is the use of guided acoustic waves. Unlike a bulk wave, a guided acoustic wave is generated at a frequency band at which the acoustic wavelength is comparable to the size and dimensions of the acoustic medium, for example, the wall thickness and diameter of a pipe. Depending on the frequency of the acoustic excitation, various guided modes may co-exist in a structure. Each guided mode has its own phase velocities, group velocities, and attenuation properties. As these guided modes may interact with surrounding pressures and media differently, selected modes may be used for sensing of those physical parameters. One challenge of using individual guided wave modes is to selectively generate and detect these modes. It becomes even more difficult to separate modes at the receiver due to mode dispersion and convergence in the vessel or pipe. Known methods to separate the modes require complex signal processing methods such as time-frequency reconstruction and 2D Fourier transform methods. These methods require complicated signal processing methods and acoustic data collection through multiple transducers or scanning process of one transducer, increasing the complexity of the sensor hardware design and installation. What is needed, therefore, is a method to generate and detect well separated guided wave modes for reliable sensing applications.

SUMMARY OF THE INVENTION

According to disclosed aspects, a method is provided for measuring a pressure of a fluid adjacent a wall of a pipe or vessel. A transducer is attached to the wall of the pipe or vessel. A signal is transmitted by the transducer at a characteristic frequency via a plurality of guided wave modes. The characteristic frequency is a frequency at which the guided wave modes are separated in time from each other when received. The signal is received after the plurality of guided wave modes travel in or through the wall a predetermined number of times. The signal has a signal receipt time after the predetermined number of times. The pressure of the fluid is calculated using the signal receipt time.

In another aspect, a method is provided for measuring fluid pressure in a pipe or vessel according to disclosed aspects. A transducer is attached to an outer wall of the pipe or vessel. A signal is transmitted by the transducer at a characteristic frequency via a plurality of guided wave modes. The characteristic frequency is a frequency at which the plurality of guided wave modes are separated in time when received. The characteristic frequency is in a range between 50 kHz and 1 MHz, or 10 kHz to 2 Mhz. The guided wave modes comprise at least one of: a circumferential shear horizontal (C-SH) wave traveling in the wall; a circumferential Lamb type (C-LT) wave traveling in the wall, and/or a cavity acoustic (CA) wave that travels through the fluid in the pipe or vessel. The signal is received after the plurality of guided wave modes travel in or through the wall a predetermined number of times. The signal has a signal receipt time after said predetermined number of times. The pressure of the fluid is calculated using the signal receipt time by correlating the signal receipt time with a pressure at the characteristic frequency.

BRIEF DESCRIPTION OF THE FIGURES

FIGS. 3A and 3B are graphs showing the amplitude of a transmitted signal, and the received signal as transmitted via various guided wave modes, as a function of time.

FIGS. 4A and 4B are graphs showing the amplitude of a transmitted signal, and the received signal as transmitted via various guided wave modes, as a function of time.

FIGS. 9A, 9B, and 9C are graphs showing signals received by a pressure sensor, and FIG. 9D is a graph showing the relationship between pressure and time delays in the received signals according to disclosed aspects.

FIG. 13 is a flowchart of a method of measuring fluid pressure according to disclosed aspects.

FIG. 14 is a flowchart of method of measuring fluid pressure according to disclosed aspects.

DETAILED DESCRIPTION OF THE INVENTION

Figure 1:
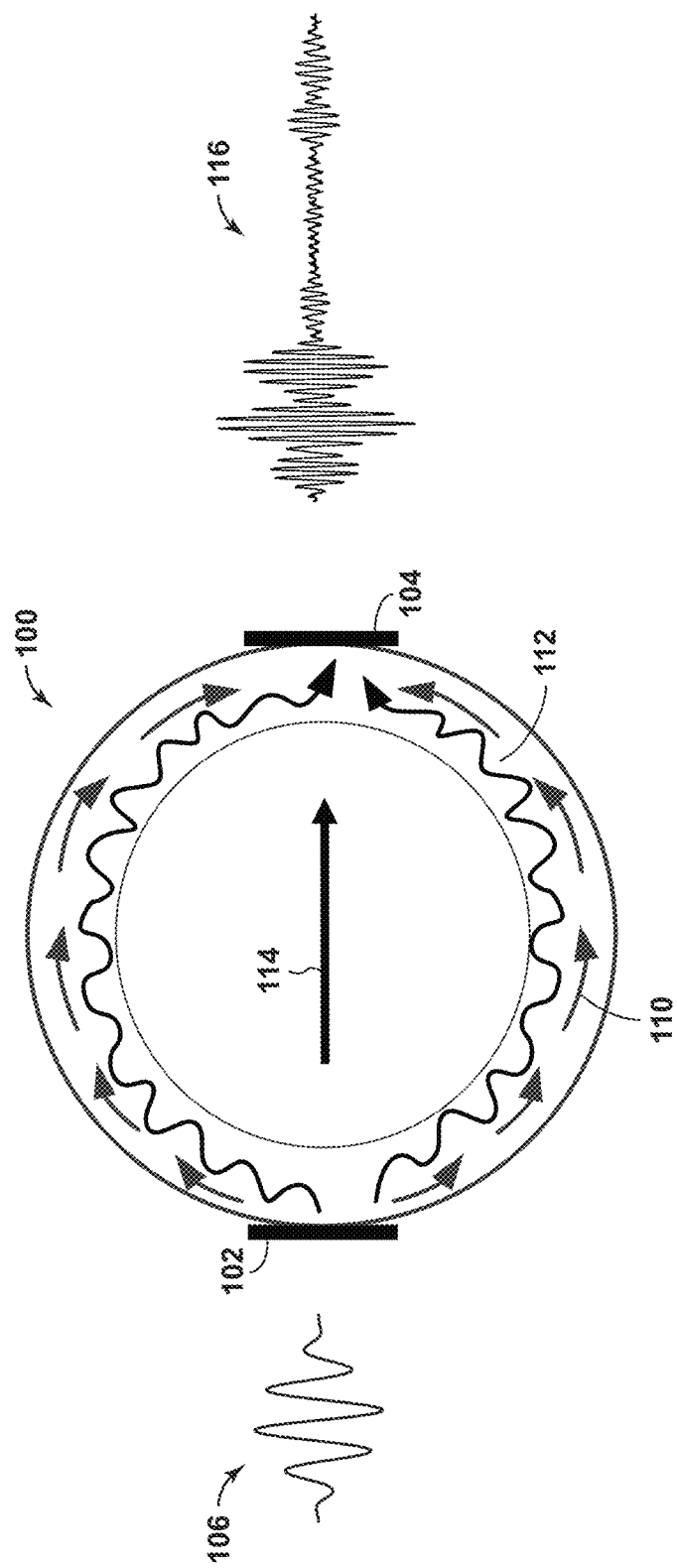
FIG. 1 is a cross-section of a pipe showing various guided wave modes according to disclosed aspects.

Various specific aspects, embodiments, and versions will now be described, including definitions adopted herein. Those skilled in the art will appreciate that such aspects, embodiments, and versions are exemplary only, and that the invention can be practiced in other ways. Any reference to the "invention" may refer to one or more, but not necessarily all, of the embodiments defined by the claims. The use of headings is for purposes of convenience only and does not limit the scope of the present invention. For purposes of clarity and brevity, similar reference numbers in several Figures represent similar items, steps, or structures and may not be described in detail in every Figure.

All numerical values within the detailed description and the claims herein are modified by "about" or "approximately" the indicated value, and take into account experimental error and variations that would be expected by a person having ordinary skill in the art.

As used herein, "fluid" refers to gases, liquids, and combinations of gases and liquids, as well as to combinations of gases and solids, and combinations of liquids and solids.

As used herein, "vessel" means any structure designed to store or transport a fluid, and includes at least one wall preventing motion of a fluid in at least one direction.

As used herein, "pipe" refers to a fluid conduit having an axial bore. A pipe can have any cross-sectional shape, such as circular, square, rectangular, etc. For the purposes of this disclosure, "pipe" also includes other tubular structures, which in the oil and gas industry include drill pipe, drill collars, tubing, casing, liner, bottom hole assemblies, and the like. Other industries may employ various types of tubular structures, and these are also included within the definition of "pipe" herein.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

All patents, test procedures, and other documents cited in this application are fully incorporated by reference to the extent such disclosure is not inconsistent with this application and for all jurisdictions in which such incorporation is permitted.

The disclosed aspects use ultrasonic guided mode propagation in a structure, such as a pipe wall, to measure the pressure inside or outside of the structure. Ultrasonic guided wave modes in/around a structure are selectively generated and detected. Examples of ultrasonic wave modes usable with the disclosed aspects are circumferential wave modes along a pipe and cavity mode inside the water across the pipe cross-section.

According to disclosed aspects, nonintrusive pressure measurements and applications use selected guided ultrasonic wave modes. In the operating frequency range of 50 kHz to 1 MHz, or 10 kHz to 2 Mhz, three guided modes are generated in a pipe or vessel: a circumferential shear horizontal (C-SH) wave in the wall of the pipe or vessel (mode 1), a circumferential Lamb type (C-LT) wave in the wall of the pipe or vessel (mode 2), and a cavity acoustic (CA) mode that travels through the fluid in the interior of the pipe or vessel (mode 3). Mode 1 and mode 3 may be used together or separately for non-intrusive pressure measurement.

The guided wave mode generation and detection as disclosed herein may be accomplished using simple ultrasonic transducers. For example, paired transducers may be used for transmit-receive operations, in which a first transducer transmits the guided wave(s) and a second transducer receives the guided wave(s). Alternatively, a single transducer may be used for pulse-echo operations, in which the transducer transmits the guided wave(s) and also receives the waves.

Figure 2:
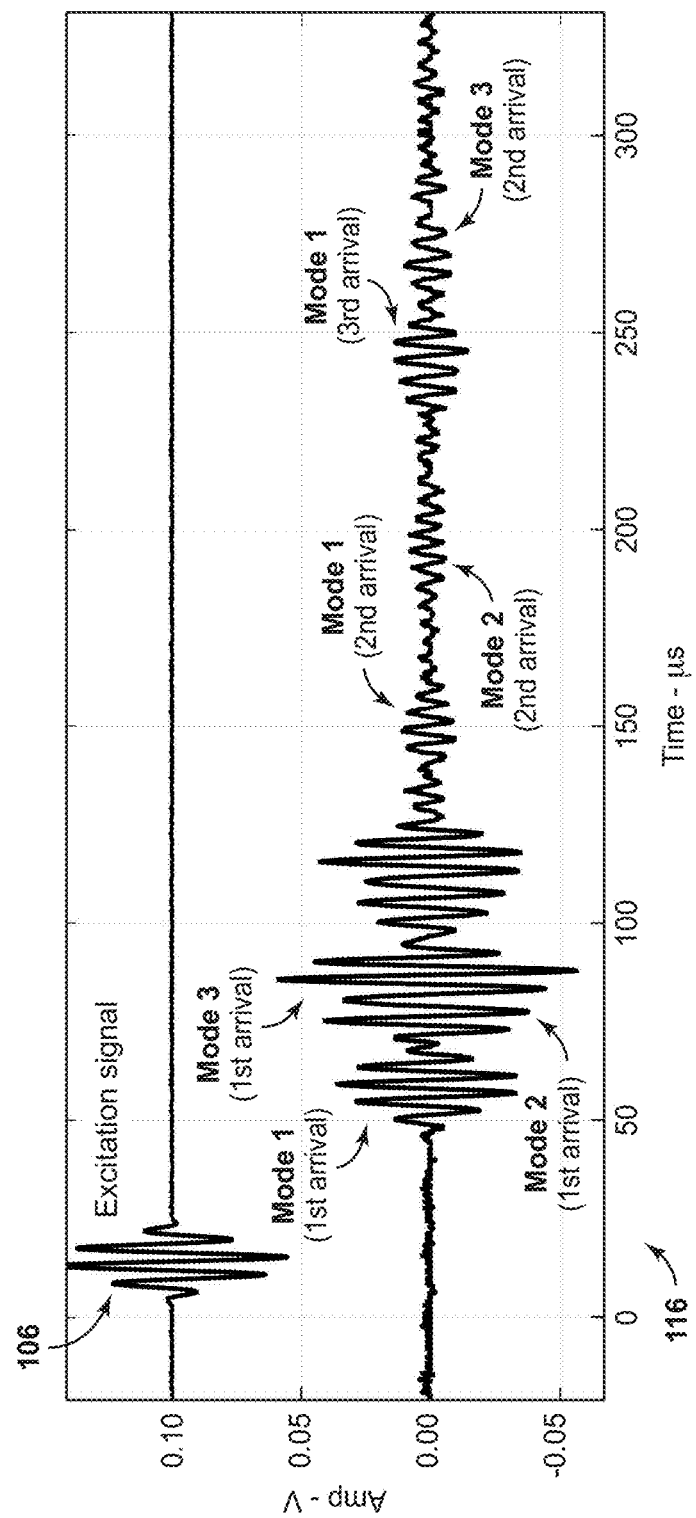
FIG. 2 is a graph showing the amplitude of a transmitted signal, and the received signal as transmitted via various guided wave modes, as a function of time.

To use the various types of guided wave modes, the wave modes must be able to be differentiated in a received signal. FIG. 1 depicts a method and apparatus for generating and detecting three different guided wave modes according to disclosed aspects. First and second ultrasonic transducers 102, 104 are clamped or otherwise attached to an outer surface of a pipe 100. The first ultrasonic transducer 102 transmits an excitation pulse 106 at a specific frequency using an envelope modified waveform and the second ultrasonic transducer 104 receives the transmitted signal from the first ultrasonic transducer. As shown schematically in FIG. 1, the excitation pulse 106 is a Hanning windowed 5-cycle sinusoidal waveform, although other types of excitation pulses may be used. The transmitted signal travels between the first and second ultrasonic transducers in the three different modes: the C-SH wave 110 of mode 1, the C-LT wave 112 of mode 2, and the CA wave 114 of mode 3. The received signal as a function of time is shown at 116 in FIG. 1 and in FIG. 2, which is a detailed view of the received signal. Since the acoustic path is circulating the circumference of the pipe 100 (modes 1 and 2) or bouncing back-and-forth in the cavity of the pipe (mode 3), these three modes will continue looping around the pipe or bouncing in the cavity till they are attenuated. The first arrival of the excitation signal 106 at the second ultrasonic transducer 104 is C-SH wave 110 (mode 1), the second arrival is C-LT wave 112 (mode 2), and the third arrival is the CA wave 114 (mode 3). However, the second arrival of the mode 3 wave is later in time than the third arrival of the C-SH wave (mode 1). This is because although all three guided wave modes are generated simultaneously, the time of arrival of each mode at the second ultrasonic transducer depends on the relationship between the time duration of an excitation pulse and the propagation time of each mode, which is a function of the speed of each mode and the length of propagation path. To separate the contribution of each node in the received signal, the frequency is selected based on the pipe properties, i.e. diameter, wall thickness and pipe material related sound speed. The effects of different frequencies are shown in FIGS. 3A and 3B, in which a Hanning windowed 5-cycle sinusoidal pulse 306 with a frequency of 180 kHz (FIG. 3A) or 220 kHz (FIG. 3B) are used to excite a 5.5 inch (14 cm) casing. It can be seen that at a frequency of 180 kHz, mode 2 and mode 3 are clearly separated in time, but mode 1 and mode 2 are not. On the other hand, at 220 kHz each of modes 1-3 are clearly separated in time. FIGS. 4A and 4B show that for a 4 inch (10.2 cm) schedule 40 stainless steel pipe, the ideal frequency for separating the modes in a received signal is different than the pipe of FIGS. 3A and 3B. At 220 kHz modes 2 and 3 are separable (FIG. 4A), while at 260 kHz all of modes 1-3 are separated in time.

The Hanning windowed 5-cycle sinusoidal wave may be selected due to its energy efficiency and its ability to generate a waveform containing a relatively narrow frequency band. It has been observed that good mode separation, as shown in FIG. 4A, is frequency-dependent, and more specifically, the narrower the frequency band, the better the mode separation. Other types of acceptable pulses or windowed waveform envelopes may include Kaier waveforms, Blackmann waveforms, Olivia waveforms, and the like. The number of waveform cycles may also be varied if needed to improve mode separation.

Figure 5:
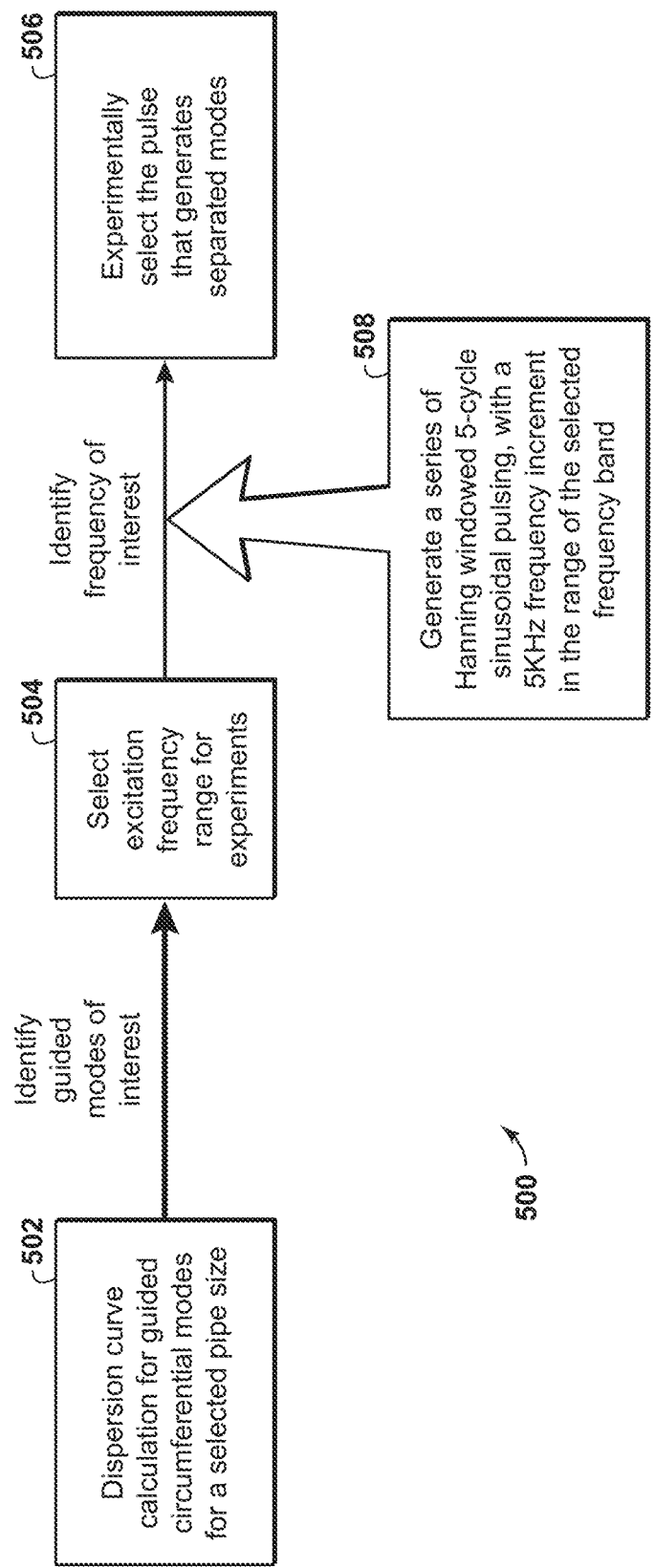
FIG. 5 is a flowchart of a method of selecting a frequency for pressure sensing using guided wave modes according to an aspect of the disclosure.

The separation of guided modes, or a pure single mode generation, in the disclosed aspects, provides a way for pressure sensing without complicated signal processing. Instead, theoretical calculations and experimental tests may be used to select the right frequency to separate those modes. FIG. 5 shows a flowchart 500 depicting a method to select the correct frequency, or characteristic frequency, for pressure sensing using guided wave modes. In block 502 a dispersion curve is calculated for guided circumferential modes for a selected pipe size, shape, and/or composition. Guided wave modes of interest can be identified, which in disclosed aspects are mode 1 guided waves as defined above. Once guided modes of interest are identified, at block 504 an excitation frequency range is selected to experimentally determine an optimal frequency at which to transmit the guided wave(s). The excitation frequency range may be selected based on known frequency ranges for other, similar pipe sizes, shapes, and/or compositions. The selection of the excitation frequency range may be impacted by the anticipated or planned frequencies used or capable of being used by the pressure sensor during actual pressure sensing. As shown at block 506, the method of determining an optimal frequency may be accomplished by generating a series of pulses at regular increments, such as a 5 kHz increment, within the excitation frequency range. For example, the series of pulses may be a Hanning windowed 5-cycle sinusoidal pulsing. Other pulse shapes may be used as desired, and determining the pulse shape may be impacted by the type/and or shape of the pulses to be generated by the pressure sensor in actual use. Based on the outcomes of block 506, and block 508 a characteristic frequency is selected that generates separate modes as shown in FIGS. 3B and 4B. The characteristic frequency is for a pipe or vessel of a certain size, shape, and composition. If more than one tested frequency is discovered that can generate separate modes, then one of the discovered frequencies may be used as the characteristic frequency for the pipe or vessel. The other discovered frequency or frequencies also may be used, either for the purposes of redundancy or to double-check the results from the first discovered frequency.

Figure 6A:
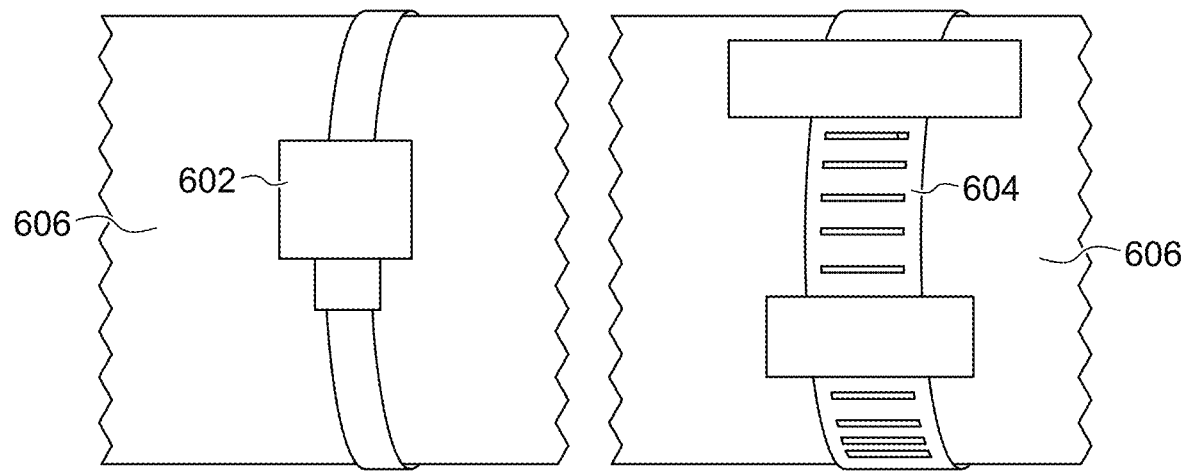
FIG. 6A is a cross-sectional view of a pipe with a pressure sensor attached.
Figure 6B:
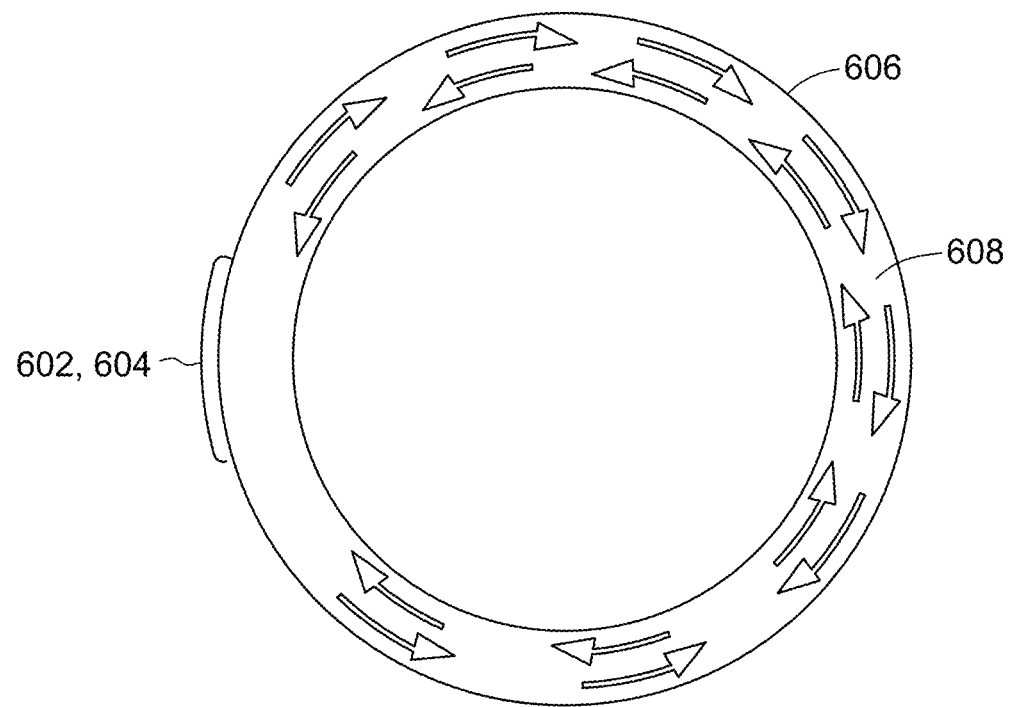
FIG. 6B is a cross-sectional view of the pipe, according to disclosed aspects.
Figure 7A:
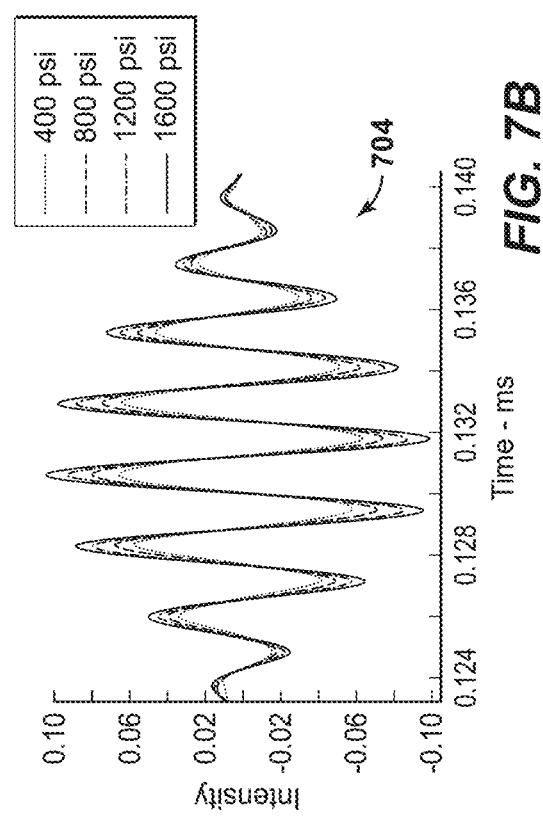
FIGS. 7A, 7B, and 7C are graphs showing signals received by the pressure sensor of FIGS. 6A-6B.
Figure 7C:
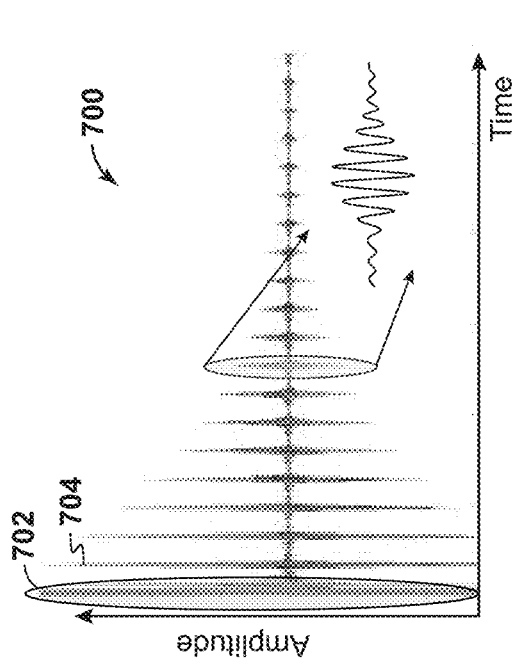
Figure 7B:
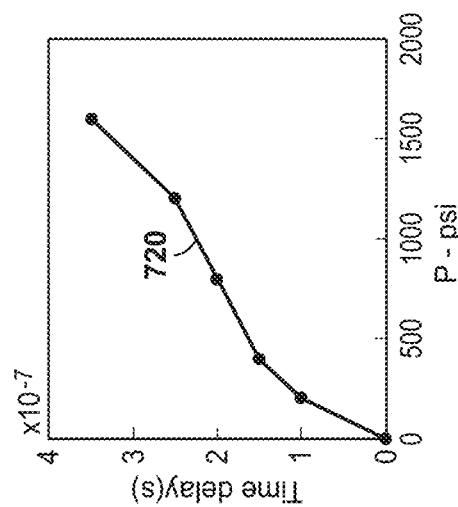
Figure 7D:
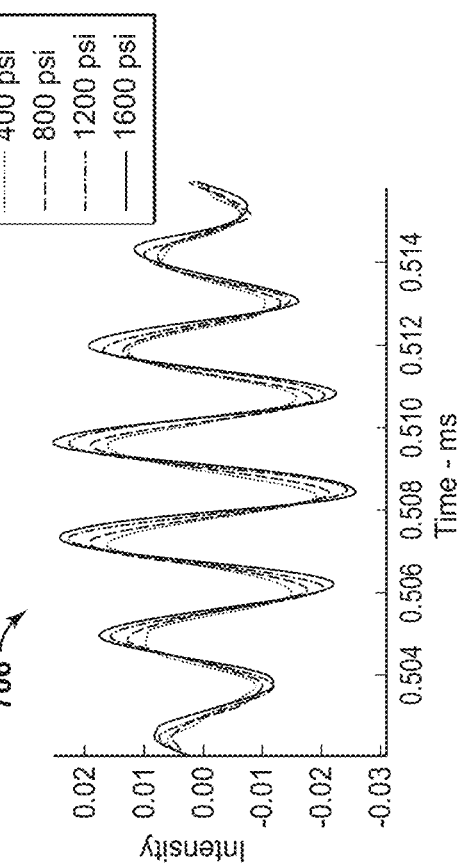
FIG. 7D is a graph showing the relationship between pressure and time delays in the received signals according to disclosed aspects.

The characteristic frequency, once determined, may be used to measure pressure in any instance where the type of the pipe or vessel may be used. For example, all 4 inch (10.2 cm) schedule 40 stainless steel pipes will have the same characteristic frequency for the purposes of the disclosed aspects. To avoid mode interferences that may occur, a pure mode 1 wave (C-SH wave) may be used. In this case, a single transducer may be employed to transmit a signal and receive each echo of the signal as the signal loops around the pipe wall, thus enabling a highly sensitive, nonintrusive pressure measurement through a larger number of loops. As shown in FIGS. 6A and 6B, a pure mode 1 wave is generated using a piece of magnetostrictive material and driven with a flexible circuit, which together form a transducer 602. The term "transducer" as used herein is synonymous with the term "sensor," and the two terms will be used interchangeably. In the depicted example the characteristic frequency for the 12.7 cm (5 in.) schedule 40 stainless steel pipe 606 was determined to be 200 kHz using previously disclosed principles. For a propagating mode 1 wave 608, its time of flight is uniquely determined by both the pipe size and the speed of sound in the pipe wall, which are directly related to the pressure inside the pipe. The pressure inside the pipe can then be measured using the time of flight. FIG. 7A is a graph 700 showing the mode 1 wave 608 as measured by the transducer 602. The mode 1 wave 608 is generated at 702 and is detected each time the wave loops around the pipe 606. For each of the 18 displayed loops the amplitude decreases or attenuates, much like a sonic echo. FIGS. 7B and 7C show the differences in receipt timing of the received wave after the second loop 704 and the tenth loop 706, respectively, for various fluid pressures inside the pipe. The more loops of the wave around the pipe, the bigger the differences of the time of flight under the same pressure, therefore leading to higher resolution for the pressure measurement. The pressure induced time delay 720 of the tenth loop of a mode 1 wave is shown in FIG. 7D. This graph may be used as a calibration curve for pressure measurement when the 10th loop is used. The demonstrated sensor resolution is about 1.38 MPa (200 psi) over a tested range of 0-11.03 MPa (0-1,600 psi) with a time resolution of 0.1 μs. With a high order of loop (e.g., a 20th loop) and a high data acquisition rate (e.g., 10 million samples per second), it is possible to increase the pressure resolution, for example, to less than 689 kPa (100 psi). This measurement resolution is not expected to change for higher pressures encountered, such as those encountered in hydraulic fracturing operations, which may exceed 68.94 MPa (10,000 psi).

Figure 8A:
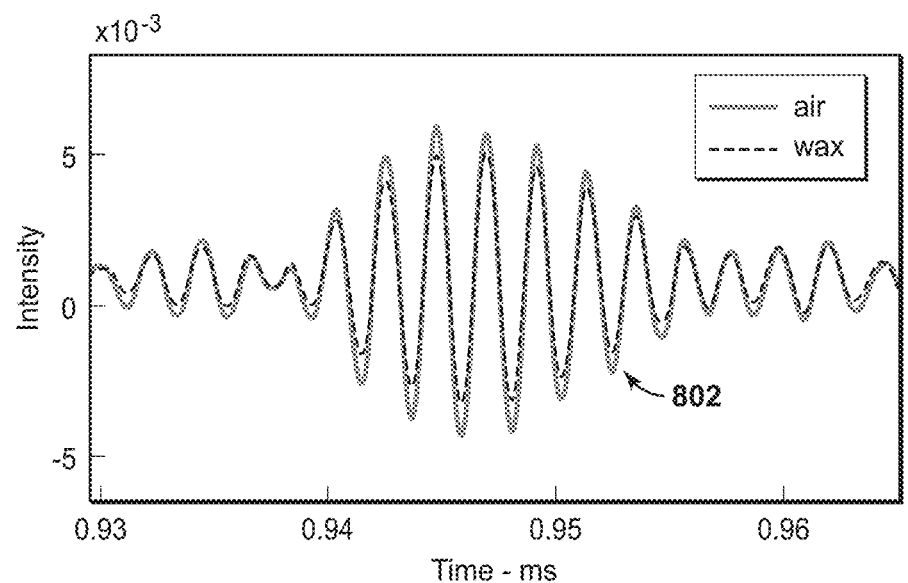
FIGS. 8A and 8B are graphs showing received signals when there is wax and sand, respectively, within a pipe.
Figure 8B:
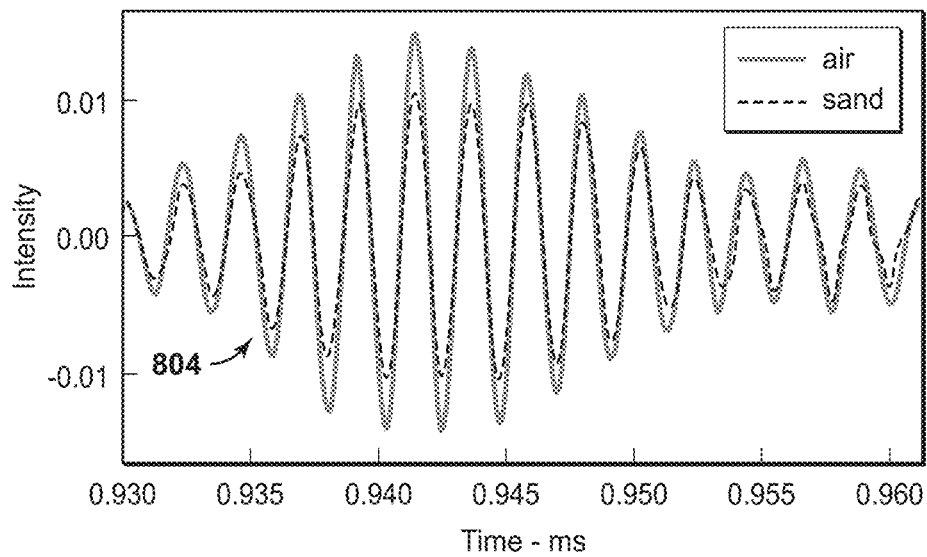

As liquid phase media do not support shear waves, pressure measurements using C-SH waves (mode 1 wave) are not affected by liquids inside or outside the pipe. Furthermore, other substances inside the pipe do not significantly affect the wave propagation of mode 1 waves. For example, a 1 mm thick layer of wax is applied to the inner surface of an 18 cm (4 in.) diameter stainless steel pipe that is 30.5 cm (1 ft.) long, then the pipe is filled with water or air. As shown in FIG. 8A, a difference in the time of flight of the mode 1 wave 802 is not detectable up to the 17th loop. Therefore, the pressure measurement is relatively immune to wax depositions in the pipe. The intensity of a signal transmitted using a mode 1 wave is slightly decreased due to the presence of wax layer, which increases acoustic energy losses to the surroundings from the pipe wall. In a similar aspect, as shown in FIG. 8B, sand decreases the intensity of a mode 1 wave 804, but does not change the sound speed significantly. Therefore, within the sensitivity limit of the transducer, neither sand nor wax changes the time of flight for a mode 1 wave, and the disclosed method is relatively immune to depositions inside the pipe.

Mode 3 guided waves, which propagate through the interior of the pipe as shown at reference number 114 in FIG. 1, can also be used to measure pressure in the pipe. This aspect of the disclosure is based on the speed of ultrasonic wave in the pipeline fluid. The speed is measured through ultrasonic propagation time in the pipe. Compared to known methods, which employ frequencies above 1 MHz, the disclosed aspects use signals at lower frequencies, and attenuation in the fluid is correspondingly lower. A longer pathway inside the liquid therefore becomes possible, and the disclosed aspects may be used for pressure measurements in larger diameter pipes or vessels. Alternatively, an increased number of reflections may be employed in a smaller diameter pipe or vessel. The longer acoustic path allows more accurate acoustic speed measurements, and by extension, pressure measurements. FIG. 9A shows two modes 902, 904 generated and detected separately using a transducer clamped on a 12.7 cm (5 in.) schedule 40 stainless steel pipe, and FIG. 9B shows a third mode that immediately follows mode 904 in FIG. 9A. The time results for a first echo (i.e., bouncing back and forth) of a mode 3 wave 906 are shown for various pressures in FIG. 9B, and the fourth echo of the mode 3 wave is shown for various pressures in FIG. 9C. Both signals can be used for pressure measurements, although the fourth echo provides a higher time resolution due to its longer acoustic path, thus providing more sensitive pressure measurements. The graph 920 of FIG. 9D shows the correlation between speeds of sound in water vs. pressures using the first loop of a mode 3 wave. The correlation between the time-of-flight of the signal and pressure is almost linear, and therefore the time-of-flight of the signal may be used for pressure measurements. The demonstrated sensor resolution is about 689 kPa (100 psi) over a tested range of 0 to 11.03 MPa (0-1,600 psi) with a time resolution of 1 μs. With a higher number of echoes or loops (e.g., a 4th loop) and a high data acquisition rate (e.g., 10 million samples per second), it is possible to increase the pressure resolution to less than 68.9 kPa (10 psi).

Based on the thermodynamic equations of state for water, the speed of sound in pure water depends on pressure and temperature. For the demonstrated pressure range (atmospheric pressure to 11.03 MPa (to 1,600 psi)) at room temperature using tap water, the sound speed change is approximately linear to the pressure: about 12 m/s for a pressure change of 10.93 MPa (1,585 psi). This is in agreement with reported speed changes of about 17 m/s for a pressure change of 9.8 MPa (1,422 psi) in sea water, where sound speed is also a function of salinity. The change of sound speed with pressure becomes nonlinear when the pressure is higher, e.g., greater than 100 MPa (14,504 psi). For high pressures both theoretical and empirical equations have been derived based on the equations of state for water in literatures. It should be noted that since mode 3 waves travel across the diameter of the pipe or vessel, pressure measurements using such mode 3 waves are not expected to be immune to wax or sand deposits inside the pipe.

The demonstrated results shown in the Figures are based on direct measurements of time-of-flight of either mode 1 or mode 3 waves. Multiple methods exist to accurately measure the time-of-flight of each mode. According to one aspect, a simple method is to detect the time delay based on the waveform peaks or dips. The sending waveform has multiple cycles at a known frequency, such as five peaks/dips (five cycles) at 200 kHz, and the receiving modes should have five peaks/dips (five cycles) at 200 kHz. Therefore the time delays between sending and receiving peaks/dips should be the same for a fixed number of loops in the received mode. Thus, the five time delays measured at the five peaks/dips can be averaged for a time-of-flight estimation. Another method of measuring time-of-flight of the wave seeks to take advantage of the full sending and receiving waveforms using an autocorrelation method. Two sections of the waveform, one from the sending and the other from receiving, are selected and the time delay is computed through autocorrelation between these two waveforms. The waveform peaks/dips detection and autocorrelation methods have different computational requirements on the computation hardware design and implementation. Still other methods of accurately measuring the time-of-flight may include analyzing the wave shape of each mode, including amplitude, phase and duration, as a whole and correlating this information to pressure. The correlation method may be based on statistical methods, where the shapes and separations in time of each mode are used for measurements. Similar to optical FTIR (Fourier-transform infrared spectroscopy) technology, where the peak of each optical absorption signal represents a unique molecular characteristics in the system, guided acoustic spectroscopy may be used, where each mode represents a unique interaction of the guided acoustic wave with environments, such as pressure. Statistical analytical tools used for FTIR signal processing may be extended to process the guided acoustic signals, such as the chemometrics method, and the principle component analysis method.

The disclosed transducers are designed to be clamped, glued, or otherwise attached in a permanent, semi-permanent, or temporary manner to the outside of a pipe or other vessel. Because the transducers are non-intrusive with respect to the interior of the pipe or vessel, the transducers can form part of sensors that may be distributed along a pipe either downhole, or along a transport pipeline at the surface to map pressure distributions. Each measurement may be sent to a central processing unit through wired or wireless communication methods for information processing. In this manner, subsurface production or pipeline leakage can be monitored remotely.

Figure 10B:
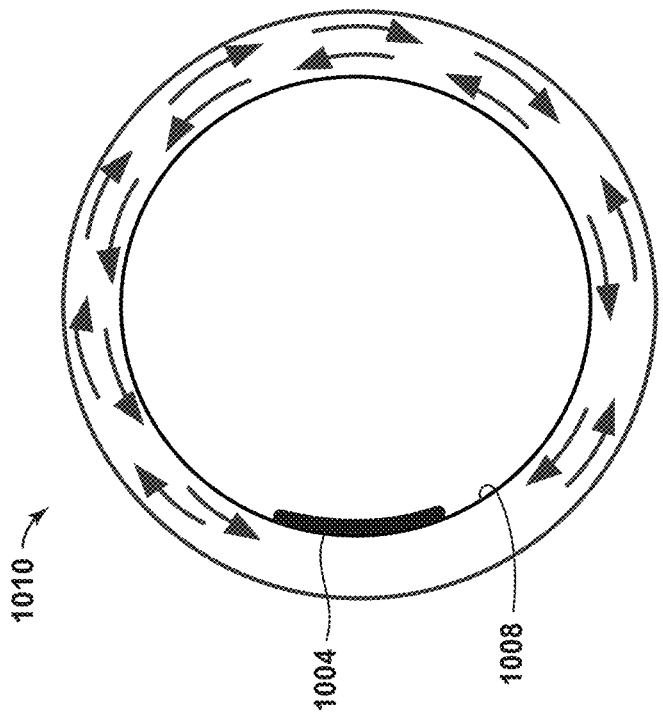
FIGS. 10A and 10B are cross-sectional views of pipes showing arrangements of pressure sensors according to disclosed aspects.
Figure 10A:
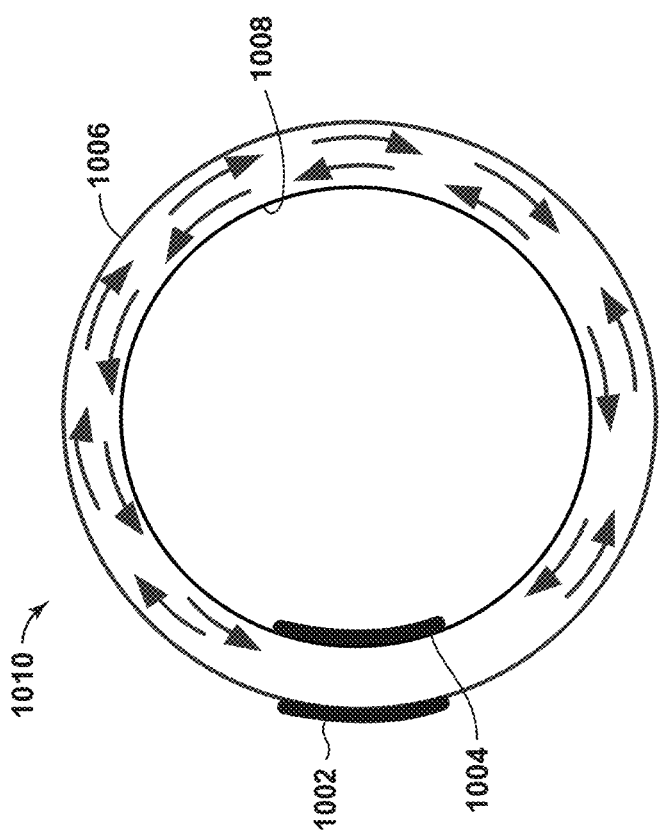

The non-intrusive transducer of the disclosed aspects may be used in various ways and applications. For example, as shown in FIG. 10A, transducers 1002, 1004 may be attached to both the outside wall 1006 and the inside wall 1008 of a vessel or a pipe 1010 to monitor pressure on either side of the wall. Transducer 1004, attached inside the pipe, can measure pressures outside the pipe. As with transducers attached on the outer wall of a pipe, the pressure on the opposite side of the pipe may be determined using the disclosed aspects. The transducer measures the deformation of the wall to infer differential pressure between the inside and outside of the pipe. FIG. 10B shows another aspect of the disclosure in which only an inner transducer is used: transducer 1004 is attached to inner wall 1008 of the vessel or pipe 1010.

In another aspect, transducers disclosed herein may be placed on the outside—or on both the outside and the inside—of a telescoping production tubular, or a surface casing. This may enable wireless measurement of trapped annulus pressure, for example. When high accuracy is needed, comparing the results from inside and outside transducers may be beneficial. Determining pressure within an annulus where no flow is occurring, or where an amount of trapped gas is unknown and could change with time, may be accomplished by monitoring the pressure, volume, and temperature within the annulus (using the disclosed transducers outside and/or inside the annulus).

Figure 11:
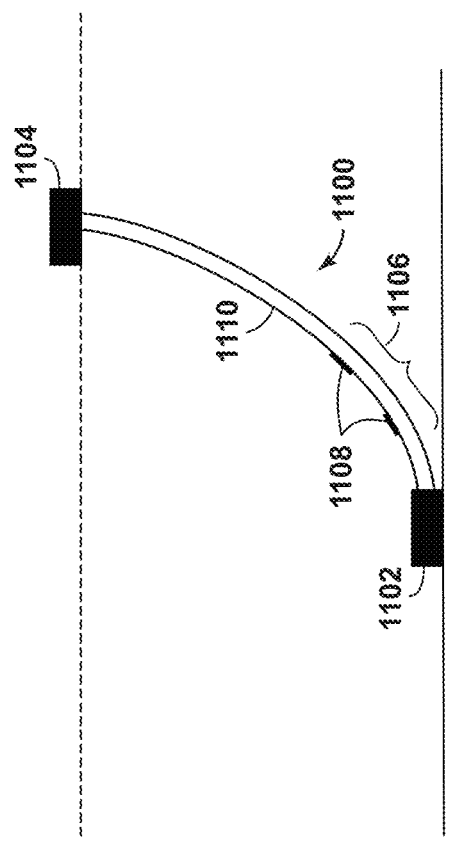
FIG. 11 is a side elevation view of a subsea riser according to disclosed aspects.

In still another aspect, the transducers disclosed herein may be used for non-intrusive measurement of pressure at the bottom of a riser used in offshore hydrocarbon operations. As used herein, and as shown in FIG. 11, a riser 1100 is a fluid conduit, such as a pipe, that transfers fluids between a subsea location 1102, such as one or more hydrocarbon wells, and a surface-based location 1104, such as a floating production facility. These locations are shown schematically in FIG. 11. Typical risers have some flexibility such that they have a generally horizontal axial orientation at the subsea location and a generally vertical axial orientation at the surface-based location. The portion of the riser transitioning between horizontal to vertical orientation, shown at 1106, induces a change in flow regimes of the fluid inside the riser, and it is beneficial to understand the fluid pressure inside the riser at least for this transitional riser portion. The disclosed non-intrusive transducers 1108, when placed on an outer surface 1110 of the riser, may measure the fluid pressure inside the riser without compromising the integrity of the riser. The transducers 1108 may be attached to a riser during manufacture of the riser or may be retrofitted on existing risers using, for example, a remotely-operated marine vehicle.

Figure 12:
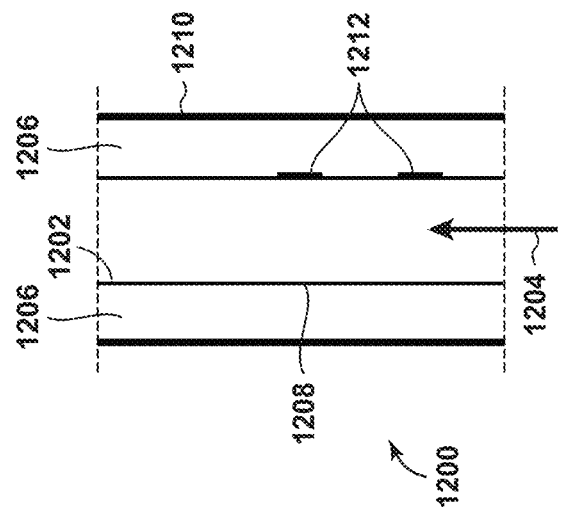
FIG. 12 is a side elevation view of a portion of a production tubular according to disclosed aspects.

In another aspect, a single sensor may be attached to a pipe or casing to monitor pressure inside the pipe or casing when deployed downhole. The sensor may also include a separate transducer/receiver to monitor pressure surrounding the housing. Once such a sensor is attached to the pipe, pressure inside the pipe or casing and outside the pipe or casing can be monitored to infer reservoir conditions. FIG. 12 is a side elevation view of a portion a production tubular 1200. The production tubular includes a pipe 1202 through which production fluids flow in the direction of arrow 1204. Other fluids, such as gas or liquids, may be present in an annular passage 1206 between the outer wall 1208 of the pipe and another tubular member 1210. The production fluids may have a significantly higher temperature than the fluids in annular passage 1206, and such a temperature difference may cause an increase in volume (through gaseous expansion or phase changes) and, consequently, an increase in the pressure of the fluids in the annular passage. This annular pressure may be high enough to deform or crush the pipe, potentially causing a catastrophic failure of the production tubular. Pressure transducers 1212 as disclosed herein may be attached to outer wall 1208 of pipe 1202 to determine the pressure of the production fluids within the pipe, thereby providing a real-time indicator of a potential for failure of the production tubular.

The disclosed transducers may be used advantageously for well completion activities. For example, a sensor may be placed on an inner or outer surface of a pipe such as a wellbore tubular. The sensor includes two transducers: the first is designed to be secured to the wall of the pipe and detect pressures on the other side of the pipe wall using the disclosed wave modes, and the second transducer is positioned within the sensor to detect pressures on the same side of the pipe wall as the sensor. Such a sensor is capable of measuring pressure on either side of the pipe wall and may monitor seal/cement integrity of a well by obtaining pressure measurements inside and/or outside the tubular. Other completion procedures such as hydraulic fracturing may be benefitted. Using a single sensor, it is possible to determine a pressure-isolating packer, i.e., the difference in pressure between a production path with the tubular and the cemented or gravel-s packed annulus outside of the tubular. In this manner, flow volumes into perforations and flow rates from screens may be determined. Additionally or alternatively, the disclosed transducer may be used for leak detection in a pipe or vessel based on pressure differentials over time or between an outside and an inside of the pipe or vessel. This can be especially beneficial when monitoring pressure in pipes that are relatively inaccessible, such as tubulars in subsea wells. A real-time or near real-time detection of a pressure difference may identify situations in which a well blowout is possible or likely, and mitigation steps may be taken before such a blowout occurs.

In yet another aspect, the disclosed pressure sensor may be used to measure elastic or inelastic deformation of a pipe or vessel. Deformation is related to the difference in pressure between the outside and inside of the pipe or vessel: changes to pressure measurements over time can indicate deformation of the wall of the pipe or vessel. An identified increase or decrease in the time required for a guided wave to perambulate or traverse the pipe or vessel wall can signify a physical deformation of the wall.

In another aspect, the disclosed pressure sensor may be used with a temperature sensor for early identification of solids formation inside a pipe or vessel, and for an early warning system prior to the formation of solids. For example, a combined pressure/temperature (P/T) sensor system may identify early wax formation risk by monitoring for the applicable pressure/temperature combinations conducive to wax formation in wellbore fluids. Similarly, the combined P/T sensor system may be used to identify early methane hydrate formation risk by monitoring for the applicable pressure/temperature combinations conducive to hydrate formation in wellbore fluids. Additionally or alternatively, the combined P/T sensor system may be used to identify early asphaltene formation risk by monitoring for the applicable pressure/temperature combinations conducive to asphaltene formation in wellbore fluids. It may also be possible to detect early scale formation in a pipe or vessel, as long as the scales form due to pressure drop or pressure/temperature drop rather than solely due to fluid composition changes. According to disclosed aspects, detecting early scale formation or other fouling uses two pressure sensors separated axially along a pipe, with a difference in pressure as measured by the two sensors indicating scale formation or other fouling within the pipe.

While the disclosed pressure sensors have been shown and described principally for pipes with circular cross-section (FIGS. 6A-6B and 10A-10B), the sensors may be used successfully with pipes having other cross-sectional shapes. Furthermore, the sensors may be used with vessels of various shapes as well. In such instances the disclosed sensors may take advantage of a particular shape to propagate the carrier waves within the wall of the pipe or vessel. For example, a bent or angular portion of the cross-sectional shape can reflect a propagating wave therein, and it is possible that one transducer/sensor can be used, and two transducers can be used for a flat section. Unlike other known guided wave solutions, the lower frequency band disclosed and used herein suffers less attenuation as well as permits multiple modes to co-exist.

The size or geometry of a pipe or vessel may make it possible for different pressures to be present at different locations of the pipe or vessel, and a single transducer may not measure these different pressures accurately. This is because each side wall can be deformed due to the difference in pressure between the inside and the outside of the pipe or vessel. In another aspect of the disclosure, multiple pressure readings for a single pipe or vessel may be obtained by attaching or securing multiple transducers each wall of the pipe or vessel. A vessel having multiple sides or walls (e.g., a square pipe or a six-sided vessel) may have a transducer attached to each side or wall thereof. Each transducer independently measures the pressure opposite the wall to which it is attached, as described herein. This aspect of the disclosure is best suited for relatively large vessels or pipes with larger cross-sections, in which edge effects do not interfere with the pressure readings.

The placement or location of the disclosed pressure transducers and sensors may be sufficiently accessible that the obtained pressure readings may be transmitted directly to a processor or recording device. Alternatively, the disclosed pressure transducers may be configured to transmit pressure measurements over a wired connection, a fiber optic connection, or a wireless connection. For example, the transducers may be configured to communicate with an acoustic wireless network having a series of communication nodes as disclosed in U.S. Pat. No. 9,759,062, the disclosure of which is incorporated by reference herein in its entirety.

FIG. 13 is a flowchart of a method 1300 of measuring a pressure of a fluid adjacent a wall of a pipe or vessel according to disclosed aspects. At block 1302 a transducer is attached to the wall of the pipe or vessel. At block 1304 a signal is transmitted by the transducer at a characteristic frequency via a plurality of guided wave modes. The characteristic frequency is a frequency at which the plurality of guided wave modes are separated in time from each other when received. At block 1306 the signal is received after the plurality of guided wave modes travel in or through the wall a predetermined number of times. The signal has a signal receipt time after the predetermined number of times. At block 1308 the pressure of the fluid is calculated using the signal receipt time.

FIG. 14 is a flowchart of a method 1400 of measuring fluid pressure in a pipe or vessel according to disclosed aspects. At block 1402 a transducer is attached to an outer wall of the pipe or vessel. At block 1404 a signal is transmitted by the transducer at a characteristic frequency via a plurality of guided wave modes. The characteristic frequency is a frequency at which the plurality of guided wave modes are separated in time when received. The characteristic frequency is in a range between 50 kHz and 1 MHz, or 10 kHz to 2 Mhz. The guided wave modes comprise at least one of: a circumferential shear horizontal (C-SH) wave traveling in the wall; a circumferential Lamb type (C-LT) wave traveling in the wall, and/or a cavity acoustic (CA) wave that travels through the fluid in the pipe or vessel. At block 1406 the signal is received after the plurality of guided wave modes travel in or through the wall a predetermined number of times. The signal has a signal receipt time after said predetermined number of times. At block 1408 the pressure of the fluid is calculated using the signal receipt time by correlating the signal receipt time with a pressure at the characteristic frequency.

An advantage of the non-intrusive pressure sensor of the disclosed aspects is its simplicity of installation. In one of the methods disclosed herein, only one transducer is required to be clamped onto, adhered to, or otherwise attached to the outer surface of a pipe or vessel. In another of the methods disclosed herein, only two transducers are required to be so attached. There is no need to penetrate the tubular or sensing device housing.

Another advantage is that because the disclosed pressure transducers operate in a frequency band between 50 kHz and 1 MHz, or 10 kHz to 2 MHz the transducers are immune to most ambient background noise, including liquid flow noises. This reduces the need for more complex signal processing algorithms and methods.

Another advantage is that the pressure measurements taken with the disclosed pressure transducers are immune to the effects of flow within the pipe, and the flowing media inside the pipe is unaffected by the pressure transducer. As no changes (e.g., holes) are made in the pipe wall, there is no weakening of the mechanical strength of the pipe or vessel, and there is no increase in deleterious aspects such as corrosion or fouling. Furthermore, because a hole or opening in the pipe or vessel wall would interfere with the disclosed wave modes travelling within the wall, the disclosed transducer (which requires no such hole or opening) provides a more accurate pressure reading than could be obtained otherwise. Additionally, when the pressure inside a pipe is measured using an intrusive pressure gauge in which a port hole in the pipe wall is required, the measurements are affected by the port. For example, a pressure wave is reflected at the port due to an acoustic impedance mismatch induced by the geometrical changes along the pipe. This reflection will be superimposed on top of the pressure wave and be measured by the intrusive pressure gauge, so that the measured pressure will be either an enhanced pressure or a reduced pressure, depending on the constructive interference or destructive interference. The change in the pressure measurement depends on the physical size of the port and the frequency of the pressure wave. This is especially a concern when a tube wave is used to characterize subsurface fractures in hydraulic fracturing operations. The disclosed non-intrusive pressure sensor can reduce or eliminate the acoustic impedance mismatch and the resulting reflected waves, thereby providing a simpler and more accurate means of pressure measurement within a pipe or vessel.

Additionally, for sensors obtaining pressure measurements based on the time of flight of a guided circumferential mode inside the pipe wall, the pressure measurements are immune to the formation, deposition, and/or retention of non-fluids within the pipe or vessel, such as wax, sand, hydrates, and perhaps even scaling. Still, when combined with a temperature sensor, the disclosed pressure sensor may infer the formation of temperature-dependent deposits therein, such as wax and hydrates. On the other hand, sensors using mode 3 waves (which pass through the cross-section of the pipe or vessel) may infer deposition of wax, hydrates, scale, sand, etc. inside the pipe based on measured pressure drop over time.

Another advantage is that the disclosed pressure sensors may operate significantly longer than other known pressure sensors. This is because the disclosed pressure measurements are based on the time-of-flight of a guided circumferential mode inside the pipe wall or vessel wall, and not the amplitude of a sensor signal. Therefore, lower-power signals may be used. This permits the disclosed pressure sensors to be used even when the sensor is deployed for a long term, as acoustic coupling degrades over time.

Still another advantage of the disclosed aspects is that because pressure measurements are based on of the overall structure or dimensions of a pipe or vessel wall, such as the circumference of a pipe, effects from local structural changes are minimized.

Yet another advantage is that a single pressure sensor unit, having two transducers as described herein, may be used to measure pressure within a pipe or vessel (e.g., inside a production tubular in an oil and gas application) using the disclosed pressure sensor, as well as outside of the pipe or vessel (e.g. in a cemented annulus or the formation outside of the production tubular).

While the foregoing is directed to aspects of the present disclosure, other and further aspects of the disclosure may be devised without departing from the basic scope thereof, and the scope thereof is determined by the claims that follow.

What is claimed is:

1. A method of measuring a pressure of a fluid adjacent a wall of a pipe or vessel, comprising:
    attaching a transducer to the wall of the pipe or vessel;
    transmitting a signal from the transducer at a characteristic frequency via a plurality of guided wave modes, the characteristic frequency being a frequency at which the plurality of guided wave modes are separated in time from each other when detected;
    detecting the plurality of guided wave modes after travel in or through the wall a predetermined number of times, each of the plurality of guided wave modes having a signal receipt time; and
    calculating the pressure of the fluid using the signal receipt times.

2. The method of claim 1, wherein the transducer is a first transducer, and further comprising:
    attaching a second transducer to the wall of the pipe or vessel.

3. The method of claim 2, wherein the wall is an outer wall of the pipe or vessel.

4. The method of claim 1, wherein the transducer is a first transducer and the wall is a first wall of the pipe or vessel, and further comprising:
    attaching a second transducer to a second wall of the pipe or vessel;
    transmitting a signal from the second transducer at a characteristic frequency via a plurality of guided wave modes, the characteristic frequency being a frequency at which the plurality of guided wave modes are separated in time from each other when detected;
    detecting from the second transducer the plurality of guided wave modes after travel in or through the second wall a predetermined number of times, each of the plurality of guided wave modes from the second transducer having second signal receipt times after said predetermined number of times; and calculating the pressure of the fluid adjacent the second transducer using the second signal receipt times.

5. The method of claim 1, wherein the transducer is a first transducer and the wall is one of an outer wall and an inner wall of the pipe or vessel, and further comprising:
    attaching a second transducer to the other of the outer wall and the inner wall.

6. The method of claim 1, wherein the wall is an inner wall of the pipe or vessel.

7. The method of claim 1, wherein the wall is an outer wall of the pipe or vessel, and wherein the calculating step calculates the pressure of fluid adjacent an inner wall of the pipe or vessel.

8. The method of claim 1, wherein the step of detecting the plurality of guided wave modes is performed by the transducer.

9. The method of claim 1, wherein the plurality of guided wave modes comprise at least one of:
    a circumferential shear horizontal (C-SH) wave traveling in the wall;
    a circumferential Lamb type (C-LT) wave traveling in the wall; and/or
    a cavity acoustic (CA) wave that travels through the fluid in the pipe or vessel.

10. The method of claim 1, wherein the transducer is a first transducer, and wherein the characteristic frequency is determined by:
    (a) transmitting an excitation pulse from the first transducer at an excitation frequency, the excitation pulse being transmitted in or through the wall, via the plurality of guided wave modes, to a second transducer attached to the outer surface;
    (b) receiving the excitation pulse at the second transducer as the excitation pulse is transmitted via the plurality of guided wave modes;
    (c) repeating steps (a) and (b) with additional excitation frequencies within a range of 50 kHz to 1 MHz, or in a range of 10 kHz to 2 Mhz; and (d) selecting as the characteristic frequency the excitation frequency at which the plurality of guided wave modes are identifiably separate when received by the second transducer.

11. The method of claim 1, wherein the characteristic frequency is determined by:
   (a) transmitting an excitation pulse from the first transducer at an excitation frequency, the excitation pulse being transmitted in the wall, via the plurality of guided wave modes, to the transducer;
   (b) receiving the excitation pulse as the excitation pulse is transmitted via the plurality of guided wave modes;
   (c) repeating steps (a) and (b) with additional excitation frequencies within a range of 50 kHz to 1 MHz, or within a range of 10 kHz to 2 Mhz; and
   (d) selecting as the characteristic frequency the excitation frequency at which the plurality of guided wave modes are identifiably separate when received by the transducer.

12. The method of claim 11, wherein the excitation pulse comprises a Hanning windowed 5-cycle sinusoidal wave.

13. The method of claim 1, wherein the characteristic frequency is in a range of 50 kHz to 1 MHz, or in a range of 10 kHz to 2 Mhz.

14. The method of claim 1, wherein the predetermined number of times is at least one.

15. The method of claim 1, wherein calculating the pressure using the signal receipt time comprises correlating the signal receipt times with a pressure at the characteristic frequency.

16. The method of claim 1, further comprising:
   measuring a temperature of a fluid adjacent the pipe or vessel; and
   using the measured temperature and the calculated pressure, identifying conditions conducive to solids formation in the fluid.

17. The method of claim 1, further comprising:
   measuring a change over time of a time required for the at least one guided wave to travel in or through the wall the predetermined number of times; and
   using the measured change over time, determining a deformation of the pipe or vessel.

18. The method of claim 1, wherein the pipe or vessel comprises a tubular, and further comprising:
   using the transducer, measuring over time an inner pressure in the tubular and an outer pressure of the tubular; and
   using a difference between the inner pressure and the outer pressure, detecting a leak of fluid into or out of the tubular.

19. The method of claim 1, wherein the pipe or vessel comprises a tubular used in a hydrocarbons completion operation, and further comprising:
   using the transducer, measuring an inner pressure in the tubular and an outer pressure of the tubular; and
   using a difference between the inner pressure and the outer pressure, evaluating a cement seal or a pressure-isolating packer used in the hydrocarbons completion operation.

20. The method of claim 1, wherein the pipe or vessel comprises a subsea riser.

21. The method of claim 1, wherein the pipe or vessel comprises a hydrocarbon production tubular configured to permit hydrocarbon production fluids to flow therein, the hydrocarbon production tubular being surrounded by annular space surrounded by an annular space, and wherein the transducer is attached to an outer wall of the hydrocarbon production tubular, the method further comprising:
   using the transducer, measuring a pressure of the hydrocarbon production fluids.

22. A method of measuring a pressure of a fluid inside a pipe or vessel, comprising:
   attaching a transducer to an outer wall of the pipe or vessel;
   transmitting a signal from the transducer at a characteristic frequency via a plurality of guided wave modes, the characteristic frequency being a frequency at which the plurality of guided wave modes are separated in time when detected, wherein the characteristic frequency is in a range between 50 kHz and 1 MHz, or 10 kHz to 2 Mhz, and wherein the plurality of guided wave modes comprise at least one of
      a circumferential shear horizontal (C-SH) wave traveling in the wall,
      a circumferential Lamb type (C-LT) wave traveling in the wall, and/or
      a cavity acoustic (CA) wave that travels through the fluid in the pipe or vessel;
   detecting the plurality of guided wave modes after travel in or through the wall a predetermined number of times, each of the plurality of guided wave modes having a signal receipt time after said predetermined number of times; and
   calculating the pressure of the fluid using the signal receipt times by correlating the signal receipt times with a pressure at the characteristic frequency.

23. The method of claim 22, wherein the transducer is a first transducer, and wherein the characteristic frequency is determined by:
   (a) transmitting an excitation pulse from the first transducer at an excitation frequency, the excitation pulse being transmitted in or through the wall, via the plurality of guided wave modes;
   (b) receiving the excitation pulse as the excitation pulse is transmitted via the plurality of guided wave modes;
   (c) repeating steps (a) and (b) with additional excitation frequencies within a range of 50 kHz and 1 MHz; and
   (d) selecting as the characteristic frequency the excitation frequency at which the plurality of guided wave modes are identifiably separate when received.

24. The method of claim 22, wherein the predetermined number of times is at least one.

* * * * *